987,366. PHOTOGRAPHIC CAMERA. CHARLES E. HUTCHINGS, Rochester, N. Y., assignor to Eastman Kodak Company, Rochester, N. Y., a Corporation of New York. Filed Sept. 28, 1909. Serial No. 519,944.

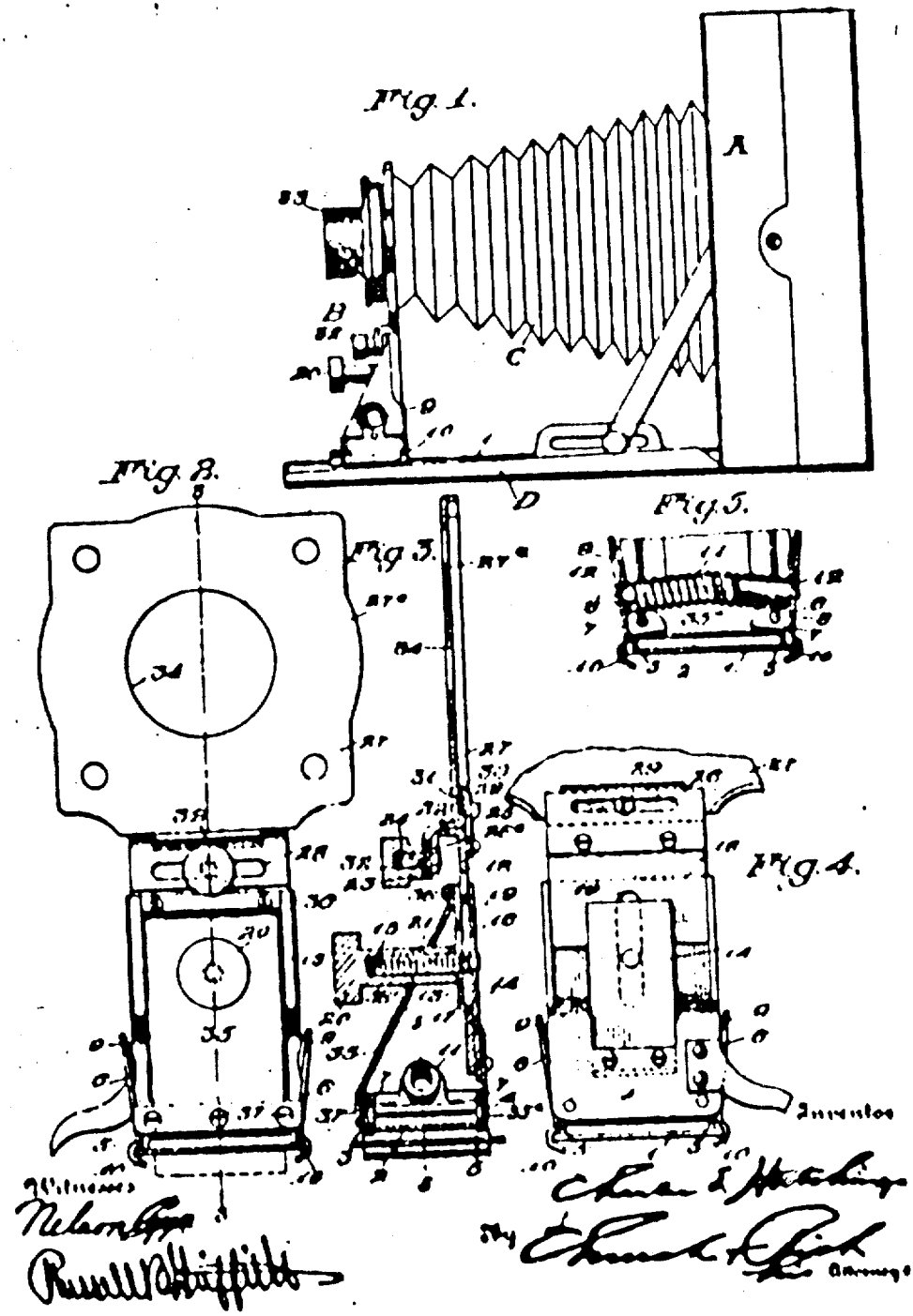

*To all whom it may concern:*

Be it known that I, CHARLES E. HUTCHINGS, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

The present invention relates to photography and more particularly to photographic cameras, the improvements being directed to the camera front or lens carriage with the object of providing a simple, cheap and serviceable device of this character which will offer convenient adjustment of the lens in all necessary directions and support the latter with firmness and stability.

To these and other ends the invention consists in certain improvements and combinations of parts all as will be hereinafter more fully described, the novel features being pointed out in the claims at the end of the specification.

In the drawings: Figure 1 is a side elevation of a camera in an extended position to show a similar view of a front or lens carriage constructed in accordance with and illustrating one embodiment of my invention; Fig. 2 is an enlarged front elevation of the carriage removed, the lens and its mounting being omitted; Fig. 3 is a central vertical section taken substantially on the line 3—3 of Fig. 2; Fig. 4 is a rear elevation thereof, the upper part of the lens board being broken away, and Fig. 5 is a detail transverse section through the lens carriage taken substantially on the line 5—5 of Fig. 3 and showing the mechanism for clamping the carriage to the track.

Similar reference numerals in the several figures indicate the same parts.

Referring more particularly to the drawings the camera in connection with which I have illustrated my invention in the present instance is of the folding type comprising a body A, and a front indicated generally by B connected to the body by the bellows C and traveling on the drop front bed D which, when the front and bellows are retracted to folded position within the body, closes the forward opening of the latter.

The bed D is fitted with a track 1 which in the present instance is shown to comprise simply a flat metal plate supported as shown in dotted lines in Fig. 2 to render its lateral edges clearly accessible for the purposes hereinafter explained. The lens carriage 2 is preferably formed of a plate having upwardly turned forward and rear flanges 3 and 4, respectively, and downwardly turned lateral flanges 5 which bear upon the track plate 1 near its marginal edges as shown in Fig. 2 to form a sliding engagement for the carriage with the track. The pair of clamping levers 6 are pivoted on opposite sides of the carriage by means of ears 7 through which are passed pivot pins 8 extending from front to rear of the carriage and supported in the flanges 3 and 4 thereof. The upper arm 9 of each lever forms a finger portion for releasing the lower arm 10 when pressed inwardly or toward each other, the arm 10 being hooked as shown to engage the lateral edges of the track 1 and normally hold the carriage rigidly fixed thereon under the influence of a helical coiled spring 11 normally compressed and bearing in opposite directions against the levers on the other sides of their pivots 8, the said spring being held in position by having its ends arranged to surround centering lugs 12 on the respective lever arms.

The rearward flange 4 of the carriage plate projects upwardly and is provided with an offset portion 13, a plate 14 secured to the lower portion of the flange constituting in effect a continuation thereof parallel with but spaced slightly from the offset portion 13 and the said plate is provided with a threaded post 15 projecting forwardly through an opening 16 in the portion 13. In the region of the bend by means of which the offset portion 13 is formed, the flange has a transverse slot or opening 17 and sliding vertically in the opening is provided a lens board supporting plate 18 having a slot 19 therein to admit the post 15. Threaded on the latter is a nut or thumb screw 20, the base of which, 21, is preferably separably formed to constitute a friction collar 21 bearing against the offset portion 13 of the flange and adapted, when tightened, to draw said portion and the backing plate 14 together with the result that the lens board supporting plate 18 is firmly clamped or gripped between them at any desired position of adjustment.

The upper end of the supporting member 18 extends forwardly and downwardly, as clearly shown in Fig. 3, to form two relatively angular faces 22 and 23, the former constituting a transverse way and the latter a depending flange having a forwardly or outwardly extending threaded post 24 thereon, while an upwardly extending plate 25 fast to the back of the support 18 forms a flange adjacent the way 22 and is provided with a slot 26 parallel with the latter.

The lower end 27 of the lens board 27ᵃ is shaped to conform to the flanges 25 and 23 and to the way 22 upon which it is adapted to slide laterally of the carriage and of the support being terminated in a flange 28ᵃ provided with a slot 28 to receive the post 24 and with a headed pin or projection 29 traveling in the slot 26 of the flange 25. The latter is also preferably provided with a shoulder 30 adjacent to the slot 26 and co-operating with a similar shoulder 31 on the lens board to prevent movement in an upward direction away from the support. A threaded nut or thumb screw 32 on the post 24 locks the lens board to the support in any desired position of lateral adjustment. The lens mount 33 is secured within the opening 34 of the lens board in any usual or preferred manner.

To brace the rearward flange 4 of the lens carriage and the other clamping parts for the lens board 18, and also to form a housing for at least a portion of the track clamping devices, I prefer to provide an inclined plate 35 fastened to the upper end of the offset portion 13 at 36 and to the forward flange 3 at 37, an opening 38 being provided therein to accommodate the post 21 and the threaded member 20.

It will be seen that with a camera front constructed in accordance with my invention any necessary adjustment of the optical axis of the camera, either a shortening toward or from or a lateral deflection parallel with the sensitized plate or film, can be readily obtained, the carriage being movable forward and backward on the track 1 by pinching together the operating portions 9 of the clamping members 6, and it will be here noted that in order to prevent such an extended releasing movement of the levers as would disengage the track engaging portions 10 entirely, allowing the carriage to fall away from the bed, I provide extensions or stops 35ª on the pivoting ears 7 of the levers which engage upon the upper side of the carriage plate 2, as shown in Fig. 5, and halt the movement of the clamping members as soon as definitely released from clamping engagement.

By loosening the nut 32 the lens board 27ª can be moved laterally on the way 22 of its support 18 to transfer the optical axis to right or left while the line of the same may be elevated or depressed by the adjustment of the support 18 vertically on the carriage. The device of my invention, it is also suggested, may be conveniently formed of stamped sheet metal parts, greatly lessening the cost of manufacture.

I claim as my invention.

1. In a camera, the combination with a track, of a carriage movable thereon having upturned flanges at its front and rear edges, clamping levers engaging the track in opposition to each other and each provided with ears pivoted between the flanges, means normally tending to hold the clamping levers in gripping engagement with the track and an extension on an ear of each lever adapted to engage the carriage for limiting its releasing movement away from the track.

2. In a camera, the combination with a lens board, of a support therefor, one of said members comprising relatively angularly arranged outer faces, and the other being arranged to have a sliding bearing on one such face and being provided with a slotted flange extending coincident with the other, a post on the latter face projecting through the slot in the flange and a nut threaded on the post and adapted to engage the flange.

3. In a camera, the combination with a support comprising a portion forming a way and flanges at either side of said way extending in opposite directions therefrom, one flange being provided with a slot parallel with the way and the other with a projecting post, of a lens board of a shape conforming to the flanged configuration of the support and arranged to slide on the way being provided with a headed pin operating in the slotted flange of the support and having a slotted flange to receive the post of the other flange of the support and a threaded nut on said post adapted to engage the slotted flange of the lens board.

4. In a camera, the combination with a support comprising a portion forming a way and flanges at either side of said way extending in opposite directions therefrom, one flange being provided with a slot parallel with the way and with a shoulder adjacent to the slot and the other with a projecting post, of a lens board of a shape conforming to the flanged configuration of the support and arranged to slide on the way being provided with a headed pin operating in the slotted flange of the support and with a shoulder abutting the shoulder on the latter in a direction transversely of the slot, said lens board having a slotted flange to receive the post of the other flange of the support, and a threaded nut on said post adapted to engage the slotted flange of the lens board.

5. In a camera, the combination with a lens carriage, of a lens board support adjustable vertically on the carriage, and a lens board adjustable laterally along the upper edge of the lens board support.

6. In a camera, the combination with a lens carriage having a vertically extending flange thereon provided with a bend forming an offset portion and with an opening in the region of the bend and a plate forming a continuation of the flange parallel with the offset portion thereof, one of said parallel members being provided with a post projecting through an opening in the other, of a lens board support movable vertically between the plate and the offset portion and having a slot therein to receive the post and a nut threaded on the latter to grip the lens board support between the offset portion and the plate when tightened against one of the latter.

7. In a camera, the combination with a track and a lens carriage movable thereon having a vertically extending flange at one side thereof provided with a bend forming an offset portion and with an opening in the region of the bend and a plate forming a continuation of the flange parallel with the offset portion thereof, one of said parallel parts being provided with a post projecting through an opening in the other, of a lens board support movable vertically between the plate and the offset portion and having a slot therein to receive the post, a nut threaded on the latter to grip the lens board support between the offset portion and the plate when tightened against one of the latter clamping mechanisms on the carriage engaging the track and a housing plate for parts of the latter connected with one of the aforesaid gripping members and with the opposite side of the carriage.

CHARLES E. HUTCHINGS.

Witnesses:
 WALTER B. PAYNE,
 RUSSELL B. GRIFFITH.